United States Patent
Eckel et al.

(10) Patent No.: US 12,386,937 B2
(45) Date of Patent: Aug. 12, 2025

(54) ADHOC ENROLLMENT PROCESS

(71) Applicant: AWARE, INC., Bedford, MA (US)

(72) Inventors: Bob Eckel, Andover, MA (US); Mohamed Lazzouni, Northborough, MA (US)

(73) Assignee: AWARE, INC., Burlington, MA (US)

( * ) Notice: Subject to any disclaimer, the term of this patent is extended or adjusted under 35 U.S.C. 154(b) by 0 days.

(21) Appl. No.: 18/666,270

(22) Filed: May 16, 2024

(65) Prior Publication Data

US 2024/0303309 A1 Sep. 12, 2024

Related U.S. Application Data (63) Continuation of application No. 18/214,247, filed on Jun. 26, 2023, now Pat. No. 12,019,728, which is a continuation of application No. 18/078,316, filed on Dec. 9, 2022, now Pat. No. 11,727,099, which is a continuation of application No. 17/186,144, filed on Feb. 26, 2021, now Pat. No. 11,531,742.

(60) Provisional application No. 62/982,351, filed on Feb. 27, 2020.

(51) Int. Cl.
| | |
|---|---|
| G06F 21/32 | (2013.01) |
| G06V 10/764 | (2022.01) |
| G06V 40/12 | (2022.01) |
| G06V 40/16 | (2022.01) |
| G06V 40/18 | (2022.01) |
| G06V 40/50 | (2022.01) |
| G06V 40/70 | (2022.01) |
| G08B 21/18 | (2006.01) |

(52) U.S. Cl.
CPC ............ *G06F 21/32* (2013.01); *G06V 10/764* (2022.01); *G06V 40/1365* (2022.01); *G06V 40/172* (2022.01); *G06V 40/197* (2022.01); *G06V 40/50* (2022.01); *G06V 40/70* (2022.01); *G08B 21/18* (2013.01)

(58) Field of Classification Search
CPC ..... G06F 21/32; G06F 21/45; G06V 40/1365; G06V 40/172; G06V 40/197; G06V 10/764; G06V 40/50; G06V 40/70; G08B 21/18

See application file for complete search history.

(56) References Cited

U.S. PATENT DOCUMENTS

| | | |
|---|---|---|
| 11,531,742 B2 | 12/2022 | Eckel et al. |
| 11,727,099 B2 | 8/2023 | Eckel et al. |
| 2008/0059807 A1 | 3/2008 | Miller, Jr. et al. |
| 2013/0015355 A1 | 1/2013 | Noone et al. |

(Continued)

OTHER PUBLICATIONS

Hube, Jens Peter "Formulae for Consistent Biometric Score Level Fusion" 2017 IEEE International Joint Conference on Biometrics (IJCB), Denver, CO, 2017, pp. 329-334.

(Continued)

*Primary Examiner* — Abhishek Sarma
(74) *Attorney, Agent, or Firm* — Jason H. Vick; Amped IP LLC (57) ABSTRACT

Methods and systems are provided for an AdHoc enrollment process. A user may be able to enroll and be verified by a system for a variety of actions or authentications without being forced to turn over personally identifiable information and without having to formally enroll. The system may compare captured biometric information with existing biometric information and may identify the user without the use of personally identifiable information.

20 Claims, 3 Drawing Sheets

(56) References Cited

U.S. PATENT DOCUMENTS

2017/0032205 A1     2/2017    Paul et al.
2023/0334136 A1    10/2023    Eckel et al.

OTHER PUBLICATIONS

Hube, Jens Peter "Neyman-Pearson Biometric Score Fusion as an Extension of the Sum Rule" SPIE Biometric Technology for Human Identification IV, Orlando, FL, 2007.
Notice of Allowance for U.S. Appl. No. 17/186,144, mailed Sep. 9, 2022.
Notice of Allowance for U.S. Appl. No. 18/078,316, mailed Apr. 5, 2023.
Office Action for U.S. Appl. No. 18/214,247, mailed Jan. 19, 2024.
Notice of Allowance for U.S. Appl. No. 18/214,247, mailed Feb. 15, 2024.

ADHOC ENROLLMENT PROCESS

CROSS REFERENCE TO RELATED APPLICATIONS

The present application is a Continuation of U.S. patent application Ser. No. 18/214,247, filed Jun. 26, 2023, now U.S. Pat. No. 12,019,728, which is a Continuation of U.S. patent application Ser. No. 18/078,316, filed Dec. 9, 2022, now U.S. Pat. No. 11,727,099, which is a Continuation of U.S. patent application Ser. No. 17/186,144, filed Feb. 26, 2021, now U.S. Pat. No. 11,531,742, which claims the benefit of and priority, under 35 U.S.C. § 119(e), to U.S. Provisional Application Ser. No. 62/982,351, filed on Feb. 27, 2020, entitled "ADHOC ENROLLMENT PROCESS," each of which are hereby incorporated by reference, in their entirety, for all that they teach and for all purposes.

FIELD

The present disclosure is generally directed to biometric authentication and, in particular, toward an AdHoc enrollment process.

BACKGROUND

Security systems often require a method of authentication to permit access or otherwise allow entry to restricted areas or zones. One form of authentication may include identifying the individual seeking entry or access through the use of a personal identification number (PIN) or password. Other systems, such as biometric security systems, may use biometrics for security purposes (e.g., fingerprint-recognition systems). The use of biometrics has significant advantages compared to traditional methods such as passwords and PINs. Often, biometric traits such as fingerprints, iris, and face scans are unique to the individual, non-invasive to acquire, and do not change with time. As such, biometric traits are one of the best ways to connect an individual to a unique identifier. Biometric traits utilize a unique human characteristic to verify the individual, rather than a user- or machine-generated identifier that can be compromised or forged. By using biometric traits to identify an individual, the risk of incorrect identification is lowered, while increasing the accuracy of a correct identification. The use of the unique human characteristic reduces the risk associated with losing or forgetting other authentication forms (e.g., a PIN or password).

Currently, most security systems require a user to enroll in the system to gain access to any restricted zone, area, or material. For example, a security system may need to have information unique to the individual (e.g., name, age, password, etc.) in order to identify the individual when the individual accesses the zone, area, or material guarded by the security system. If the individual is not registered in the system, the system cannot recognize the individual, and may prevent access. Users who wish to utilize or be recognized by the security system must divulge information in order to be registered with the system, which the user may wish to avoid.

DETAILED DESCRIPTION

Embodiments of the present disclosure will be described in connection with an AdHoc enrollment process. Embodiments of the present disclosure at least beneficially enable a user to interact with a system without requiring a formal enrollment process. The use of the AdHoc enrollment process may, in some embodiments, improve or otherwise provide increased privacy and/or flexibility to an individual. For example, the individual may wish to avoid disclosing excess or extraneous information when attempting to verify his identity (e.g., providing a social security number to access a secure area). The use of the AdHoc enrollment process may allow the individual to simply provide a facial scan, which will then be used later by a system (e.g., a company controlling access to the secure area) to verify the user without requiring the user to provide further information. In some embodiments, the individual may not need provide further details, as a non-user device may be configured to capture the individual's biometrics (e.g., a security camera capturing a facial scan) without the individual needing to separately submit information. Only information the individual wishes to divulge may be used by the system. Embodiments of the present disclosure further at least beneficially enable identification of an individual based on captured biometric data. Exemplary embodiments of the present disclosure also beneficially enable for identification of an individual based on a predetermined degree of likelihood, such as by permitting a user to manually or automatically select a threshold for a confirmed match between a captured scan and an existing scan.

Figure 1:
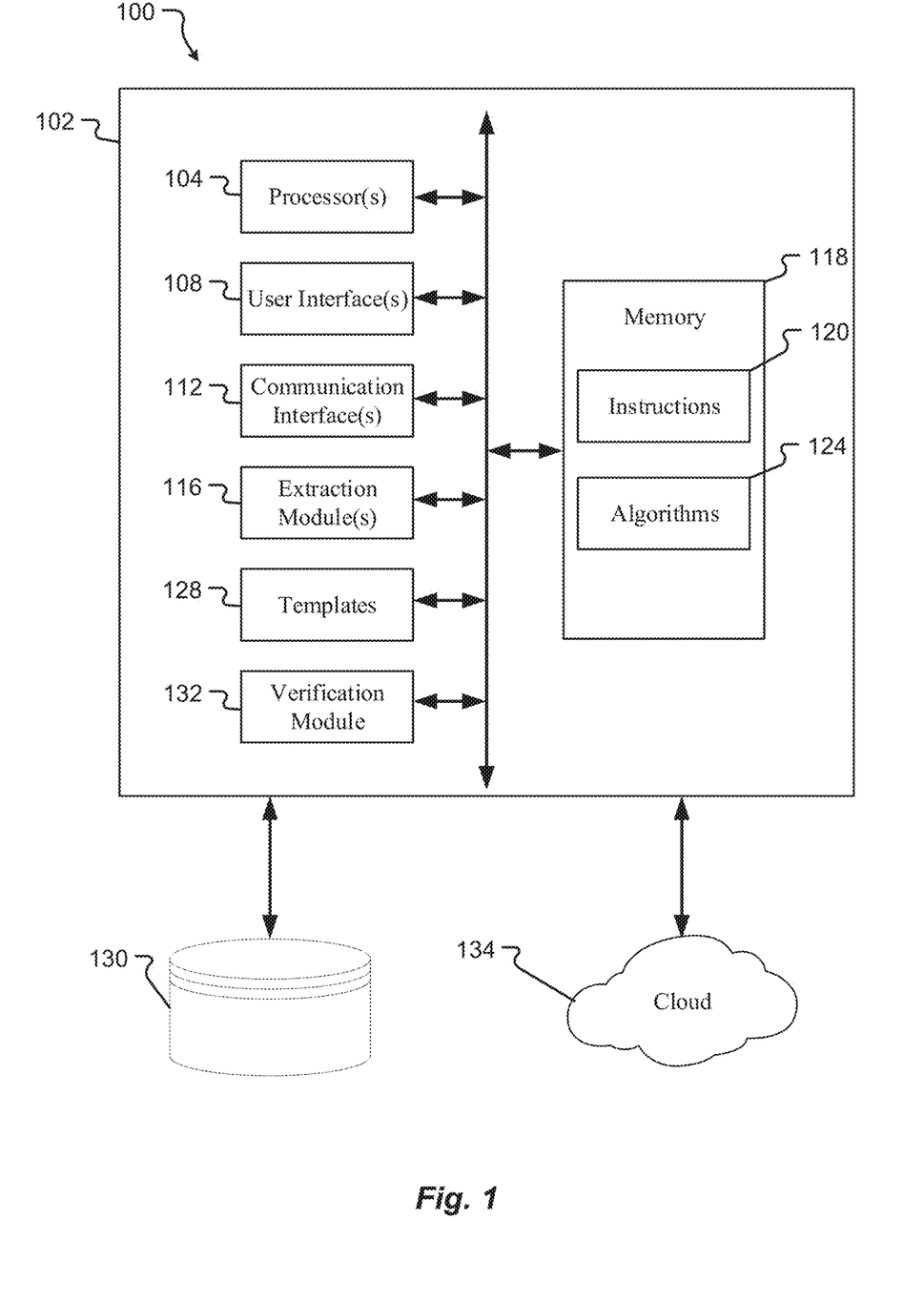
FIG. 1 shows a block diagram of a system in accordance with embodiments of the present disclosure.

Turning first to FIG. 1, an exemplary system 100 in accordance with at least one embodiment of the present disclosure is shown. The system 100 as described herein permits a user to create and store biometric data for use in, for example, identification of the user; to communicate (e.g., send and receive) information with other devices; to enroll a user (e.g., for whitelisting, verification, etc.); and/or to determine if the user is validated, authorized, and/or otherwise allowed to enter and/or access a location (e.g., enter a restricted area, determine if the user is whitelisted, determine if triggering an alarm is appropriate given the identity of the user, etc.).

The system 100 comprises a computing device 102, a database 130, and/or a cloud or other network 134. Systems according to other embodiments of the present disclosure may comprise more or fewer components than the system 100. For example, the system 100 may not include the database 130. In some embodiments, the database 130 may be located within the computing device 102.

The computing device 102 comprises at least one processor 104, at least one user interface 108, at least one communication interface 112, at least one extraction module 116, at least one memory 118, instructions 120, one or more algorithms 124, one or more templates 128, and at least one verification module 132. Computing devices according to other embodiments of the present disclosure may comprise more or fewer components than the computing device 102.

The processor 104 of the computing device 102 may be any processor described herein or any similar processor(s). The processor 104 may be configured to execute instructions stored in the memory 118, which instructions may cause the processor 104 to carry out one or more computing steps utilizing or based on data received from the database 130 and/or the cloud 134 as discussed at least in accordance with the flowcharts provided herein.

The memory 118 may be or comprise RAM, DRAM, SDRAM, other solid-state memory, any memory described herein, or any other tangible, non-transitory memory for storing computer-readable data and/or instructions. The memory 118 may store information or data useful for completing, for example, any step of the method 200 and/or method 300 described herein, or of any other methods. The memory 118 may store, for example, instructions 120 and/or one or more algorithms 124. Such instructions or algorithms may, in some embodiments, be organized into one or more applications, modules, packages, layers, or engines. The algorithms and/or instructions may cause the processor 104 to manipulate data stored in the memory 118 and/or received from or via the database 130 and/or the cloud 134.

The computing device 102 may also comprise one or more user interfaces 108. The user interface 108 may be or comprise a keyboard, mouse, trackball, monitor, television, screen, touchscreen, smartphone, keypad, a physical security device, an electronic lock, and/or any other device for receiving information from a user and/or for providing information to a user. The user interface 108 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some embodiments, the user interface 108 may be useful to allow a user to modify instructions to be executed by the processor 104 according to one or more embodiments of the present disclosure, and/or to modify or adjust a setting of other information displayed on the user interface 108 or corresponding thereto.

Although the user interface 108 is shown as part of the computing device 102, in some embodiments, the computing device 102 may utilize a user interface 108 that is housed separately from one or more remaining components of the computing device 102. In some embodiments, the user interface 108 may be located proximate one or more other components of the computing device 102, while in other embodiments, the user interface 108 may be located remotely from one or more other components of the computer device 102.

The computing device 102 may also comprise a communication interface 112. The communication interface 112 may be used for receiving image data or other information from an external source (the database 130, the cloud 134, and/or any other system or component not part of the system 100), and/or for transmitting instructions or other information to an external system or device (e.g., another computing device 102, the database 130, the cloud 134, and/or any other system or component not part of the system 100). The communication interface 112 may comprise one or more wired interfaces (e.g., a USB port, an ethernet port, a Firewire port, coaxial cable, fiber-optic cable, and/or combinations thereof) and/or one or more wireless transceivers or interfaces (configured, for example, to transmit and/or receive information via one or more wireless communication protocols such as 802.11a/b/g/n/ac, Bluetooth®, NFC, ZigBee®, communication over a cloud network, 4G, 5G, antennas for transmitting/receiving wireless signals, combinations thereof, and so forth). In some embodiments, the communication interface 112 may be useful for enabling the computing device 102 to communicate with one or more other processors 104 or computing devices 102, whether to reduce the time needed to accomplish a computing-intensive task or for any other reason.

The computing device 102 may also comprise an extraction module 116. The extraction module may be configured to extract biometric information associated with a user. For instance, the user may wish to store or provide one or more biometric items (e.g., fingerprints, iris scans, handprint scans, face scans, etc.), or the system 100 may require the user to provide a biometric item (e.g., to access a restricted area monitored by the system 100). In some embodiments, the extraction module 116 may further access features or instructions in a user device to capture the biometric information. Examples of devices in or used by the extraction module 116 include, but are not limited to, a fingerprint scanner, camera, microphone, combinations thereof, and/or any other internal or external capture method coupled with the user device to capture the biometric information. In some embodiments, the extraction module 116 be manipulated by a processor (e.g., a processor 104) to carry out the extraction of one or more biometric items in accordance with embodiments of the present disclosure.

The computing device 102 may also comprise one or more templates 128. The template 128 may be recorded biometric information (e.g., fingerprint scans, facial scans, iris scans, pulse rate measurements, palm scans, voice scans, blood pressure measurements, hand vein pattern scans, ear scans, signature scans, etc.), biographical information (e.g., a password, a user PIN, a street address, a birth date, a phone number, a business name, etc.), behavioral data, metadata associated with the biometric information and/or biographical information, and/or any combinations thereof. In some embodiments, the template 128 may be a combination of one or more types of biometric information (e.g., a combination of data from a fingerprint scan and a face scan). The template 128 may be used by the system 100 and/or one or more components thereof (e.g., a computing device 102, a database 130, a cloud 134, etc.) to, for example, verify the identity of a user associated with the template 128. In some embodiments, the template 128 may be compared to and/or matched with one or more existing templates (e.g., templates stored in a database 130) to determine the identity of the user. For instance an algorithm, such as the algorithm 124, may compare the biometric data contained in the template 128 (e.g., data associated with biometric items captured or extracted from a user) with existing templates to identify the user (e.g., if the biometric data matches an existing template, the system 100 may determine that the identity of the user tied to the existing template is the identity of the user providing the captured biometric data).

The computing device 102 may also comprise a verification module 132. The verification module 132 may be configured to pre-filter any extracted information (e.g., biometric information extracted by the extraction module 116) to determine the authenticity of the captured information. For instance, the verification module 132 may utilize preface filtering techniques to determine whether captured face scans truly depict a the face of the user and can also have anti-spoofing technology to determine is the device is being subjected to a presentation attack. In instances where the captured scan is not of a user's face (e.g., the user was wearing a mask when the scan was performed), the verification module 132 may omit the storage and/or use of the captured scan or portions thereof. In another example, the verification module 132 may be or configured to connect to a scanner that is capable of detecting silicon fingerprinting, such that the verification module 132 may be able to determine when a user is attempting to enter fingerprints of an individual who is not the user. In some embodiments, the verification module 132 may comprise a quality module which may be capable of determining a quality associated with the captured biometric information. In such embodiments, the quality module may be instructions stored in a memory that, when executed by a processor, cause the processor to operate, for example, a machine learning or artificial intelligence algorithm that may detect poor quality in the biometric information. For example, the algorithm may be capable of analyzing color values associated with pixels depicting a captured facial scan. The color values may be compared to a predicted value, and an algorithm may determine a difference therebetween (e.g., a difference between each of the color values of each pixel and the predicted value). The difference may then be compared to a predetermined threshold, with values exceeding the threshold being deemed insufficient for use. In some embodiments, the algorithm may analyze sound waves (e.g., sound waves associated with a voice scan). In such embodiments, various aspects of the sound waves (e.g., wave amplitude, frequency, speech patterns, etc.) may be analyzed by the algorithm and compared to predicted sound wave values (e.g., human speech may be predicted to be within certain frequencies), which may be used to accept or reject the captured voice scan (e.g., a voice scan with too high or too low a frequency may be rejected).

In some embodiments, the verification module 132 may be configured to match, compare, or otherwise determine differences between two or more biometric templates and/or one or more biometric items contained therein. For instance, the verification module 132 may comprise or be processor (e.g., a processor 104) capable of utilizing one or more algorithms (e.g., algorithms 124) to compare two biometric templates. The two biometric templates may include a biometric template created based on biometric information provided by a user (e.g., a facial capture of a user with a camera or other imaging device) as well as a biometric template based on previously captured biometric information (e.g., a previously stored biometric template associated with the user). The algorithms utilized by the verification module may be artificial intelligence and/or machine learning programs configured to determine differences between the two biometric templates (e.g., visual differences, differences in stored data such as binary values, etc.) and may generate a message (e.g., an electronic notification) based on the results of the comparison.

For example, the algorithm may examine borders of the biometric templates (e.g., a shape of a border of a facial scan). The borders may be examined based on, for example, shape (e.g., curvature and/or contour information), size (e.g., relative number of pixels or other values composing the biometric template), combinations thereof, and/or the like. In another example, the two biometric templates may be manipulated or otherwise transformed (e.g., through linear transformations, linear mapping, passed through a hash function, etc.) and then compared. The comparison may comprise examining the behavior (e.g., changes in value, shape, density, etc.) of pixel values and/or stored data in the two templates after transforming the templates. In another example, the algorithm may compare a biometric template comprising voice data with a previously captured biometric template comprising voice data. The algorithm may examine different voice characteristics (e.g., speech pattern, pitch, tone, vocal frequency, sound wave amplitude, etc.) in the data when comparing the two biometric templates.

The message may be a message (e.g., a confirmation or other electronic signal) configured to indicate (e.g., to a system 100) whether the two biometric templates match. In some embodiments, the message may be a binary signal that indicates whether or not a match has occurred. For instance, the message may confirm (e.g., as indicated by a value of 1) that a captured biometric template such as the template 128 matches (e.g., aligns with, shares similarities to a degree of confidence with, etc.) an existing template, and may alternatively deny (e.g., as indicated by a value of 0) that the captured biometric template does not match one or more existing templates. In some embodiments, the message may cause the system 100 to perform one or more actions or operations (e.g., permitting a user to access an area, whitelisting a user, triggering an alarm system, etc.) based on the results of the message. In some embodiments, the system 100, one or more components thereof, and/or systems external to the system 100 may idle or otherwise pause certain operations until receipt of the message. For instance, in embodiments where the system 100 communicates with a system overseeing access to a restricted area, such as a security system overseeing entry to the restricted area through a locked door, the system 100 may first extract (e.g., by a camera near the locked door) or otherwise request the user to submit a biometric item (e.g., a fingerprint scan). The system 100 may then perform matching and send a message to the security system indicating, based on the matching, whether the user is permitted to access the location. In such embodiments, the security system may keep the individual from accessing the restricted area (e.g., by keeping the door locked) until receipt of the message. Upon receipt, the security system may perform one or more actions based on the message (e.g., causing the door to become unlocked in the event that the message indicates that the user is authorized, causing the door to remain locked in the event that the message indicates that the user is unauthorized, causing an alarm system to trigger, etc.).

Figure 2:
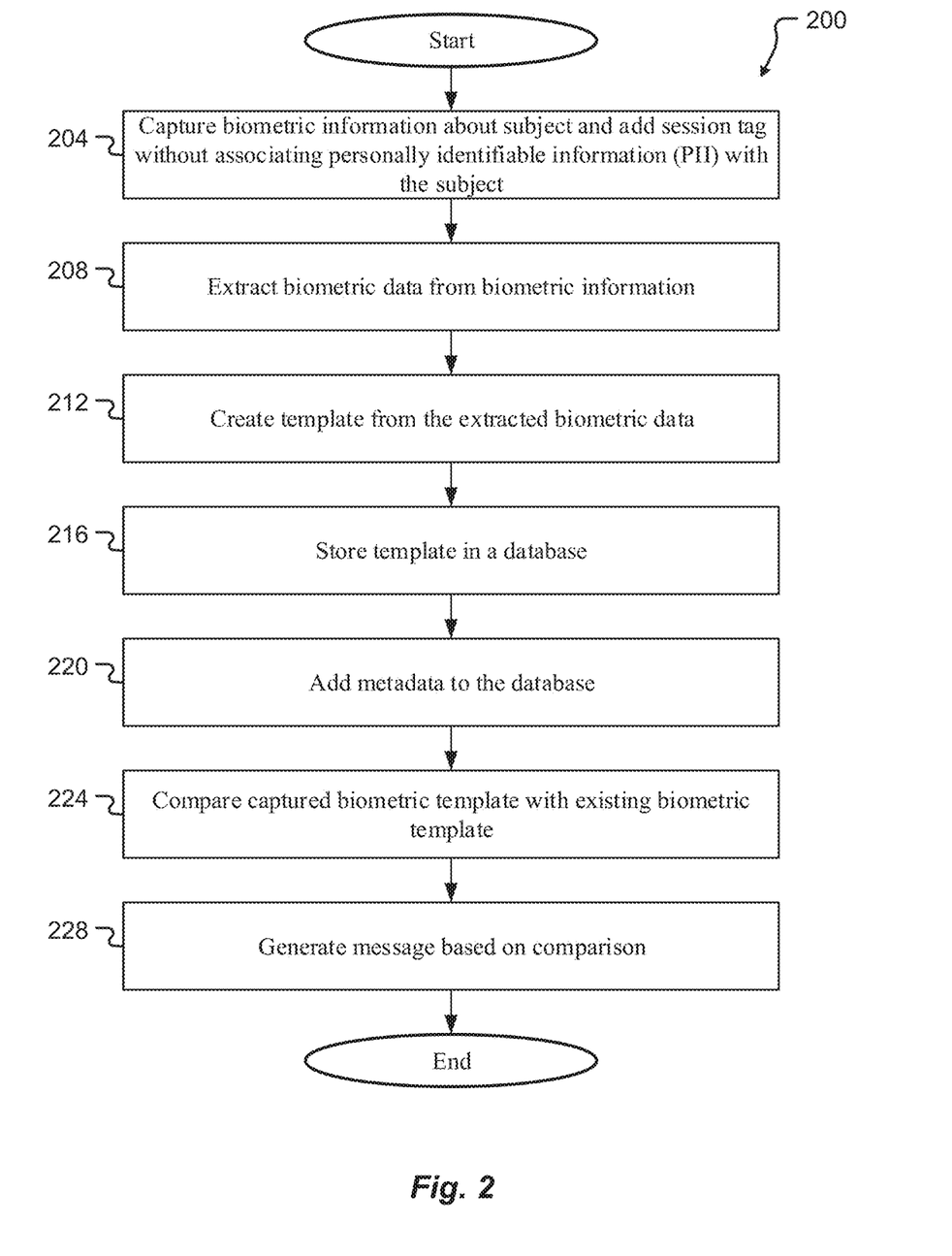
FIG. 2 shows a flowchart in accordance with embodiments of the present disclosure.

FIG. 2 depicts a method 200 that may be used, for example, for an AdHoc enrollment process. Generally speaking, the method is used to capture and add a user to a system without requiring the user formally enroll in the system, while also maintaining user confidentiality by omitting associating personally identifiable information (PII) therewith.

The method 200 (and/or one or more steps thereof) may be carried out or otherwise performed, for example, by at least one processor. The at least one processor may be the same as or similar to the processor(s) 104 of the computing device 102 described above. The at least one processor may be part of a system (such as a system 100). A processor other than any processor described herein may also be used to execute the method 200. The at least one processor may perform the method 200 by executing instructions stored in a memory such as the memory 106. The instructions may correspond to one or more steps of the method 200 described below. The instructions may cause the processor to execute one or more algorithms, such as one or more algorithms 124.

The method 200 comprises capturing biometric information about a subject (e.g., a user) and adding a session tag without associating personally identifiable information (PII) with the subject (step 204). In some embodiments, the method 200 and/or one or more steps thereof such as step 204 may be triggered based on one or more actions of a user. For example, the method 200 may begin when a user enters a restricted area or attempts to do so. The user may approach or otherwise enter a predetermined distance of a locked door, for example, to access the restricted area. In such embodiments, the step 204 may avoid capturing the biometric information from any individual in the area who is not attempting to enter the locked door (e.g., passing individuals who are not within the predetermined distance of the locked door). In another example, the method 200 may be used by a user to monitor entry onto private property (e.g., an entry of an individual into a driveway on a private residence or property). The method 200 may capture a variety of biometric information from the user (e.g., a facial scan, a fingerprint scan, a voice scan, etc.). In some embodiments, the additional or alternative information (e.g., non-biometric information such as a password) may be captured. In some embodiments, more than one biometric may be captured (e.g., a facial scan and a voice scan) for use in the method 200. For example, the user may be attempting to access a locked door in the user's workplace and may permit the capture of a facial scan and a voice scan. A system (e.g., a system 100) may capture the facial scan using one or more extraction modules (e.g., a camera and a microphone for the respective facial and voice scans) and may implement the method 200 to process the extracted biometric information to determine if the user may pass through the locked door (which is described in greater detail below).

A session tag may be added to the captured biometric information. In one embodiment, the session tag may depict information related to data associated with the capture biometric information (e.g., timestamp of the capture, label indicating type of biometric captured, etc.) without utilizing or associating PII with the captured biometric information. For example, a security camera controlled by a company or organization may capture one or more biometric modalities associated with employees who are enrolled in the company. The company system may tag non-employees (e.g., a janitor, a delivery man, other service providers, etc.) using non-PII labels (e.g., labeling the janitor with a meta-tag such as "JANITOR," labeling a delivery provider as "DELIVERY," etc.) with the label. The label may then be stored in a database (e.g., a database 130) without tagging the individual with PII.

In another example, a system (e.g., a system 100) may omit from labeling the captured biometric information with personal user information, such as a user's name, address, date of birth, social security number, physical characteristics (e.g., height, weight, etc.), driver's license information, bank account information, email address, combinations thereof, and/or the like. The session tag may be an electronic label (e.g., metadata) that permits the system to recognize, categorize, and/or store the captured biometric information such that the biometric information can be accessed or retrieved from storage without significant effort. In some embodiments, the session tag may be used by the system in lieu of other metadata to protect the identity and/or confidentiality of an individual.

The method 200 also comprises extracting biometric data from the biometric information (step 208). The extracted biometric data may be information organized or formatted in a predetermined formation (e.g., sorted or otherwise stored as a matrix, vector, tensor, etc.) that uniquely reflects the biometric information associated with the user. For example, in the case of a facial scan, the biometric data may be a matrix of values associated with the entropy, average energy, grayscale pixel value, combinations thereof, and/or the like of each pixel of the captured facial scan. The biometric data extracted may be stored by a system (e.g., a system 100) and/or one or more components thereof (e.g., a computing device 102, a database 130, etc.). In some embodiments, the biometric data and/or the captured biometric information may be temporarily stored in the system, such that the data may be erased, removed, or deleted from the system after a predetermined time and/or stored in volatile memory (e.g., stored in RAM that is reset after the system is powered off).

In some embodiments, the amount of biometric data captured may be based on the amount of certainty required to validate the user. For instance, in embodiments where access to a restricted area is required (e.g., a biohazardous laboratory, an R&D laboratory, a server room, etc.), additional biometric data may be requested by a system (e.g., a system 100) to more accurately verify the user. In other embodiments, such as identifying an authorized mailman to enter a property, the property owner may set the system to require less biometric data and/or fewer biometric items (e.g., using only a facial scan to confirm the mailman). In some embodiments, a user (e.g., an authorized individual controlling the system 100 and/or one or more components thereof) may have control over setting a predetermined amount of biometric data required by the system depending on, for example, application of the system 100.

The method 200 also comprises creating a template from the extracted biometric data (step 212). The template may be a rearrangement of the extracted biometric data (e.g., a linear transformation on the data) and/or a fusion (e.g., combination) of one or more biometric items contained in the biometric data. For example, the template may be a mixture of biometric data associated with a facial scan and a voice scan, in embodiments where an individual has submitted both a facial scan and a voice scan to a system (e.g., a system 100 using one or more extraction modules 116). The template may be stored, for example, in a database (e.g., a database 130) for later use by a system (e.g., a system 100) and/or one or more components thereof (e.g., a computing device 102). In some embodiments, the template may be displayed on a user device (e.g., via a user interface 108) and/or may be communicated (e.g., using a communication interface 112) over a network.

The template may be used by one or more systems described herein and/or for one or more of the methods described herein to verify the identity of the user. For instance, the template may be matched with an existing template of the user (or otherwise compared, with a match being based on the comparison surpassing or falling below a predetermined threshold). When the templates match, the system may confirm the identity of the user. The system may generate, for example, a confirmation (e.g., electronic signal) indicating that the templates match, and/or indicating the identity of the user.

The method 200 also comprises storing the template in a database (step 216). The database may be any database mentioned herein (e.g., a database 130), but may additionally or alternatively be a database not specifically mentioned herein. In some embodiments, the template may only be temporarily stored in the database (e.g., for a predetermined amount of time) before being deleted, transferred, or otherwise removed from the database. The temporary storage may be used, for example, to protect confidential user information, biometric information associated with the user, and/or the like. In some embodiments, the database may be connected to one or more devices over a network and may be capable of sharing the template and/or information related thereto to the one or more devices. For example, the database may provide access for third parties to access the template when attempting to verify an individual or may otherwise use the template to identify an individual (e.g., such as when a user attempts to access a platform, database, application, location, or the like).

The method 200 also comprises adding metadata to the database (step 220). The added metadata may be data related to describing, labeling, and/or otherwise depicting information associated with the template (e.g., a set of fields describing information in addition to the information stored in the template). The metadata may include, for example, a timestamp (e.g., a date, time, and/or location at which the template was created), size information (e.g., the amount of space needed to store the template), user information (e.g., name, date of birth, etc.), file type, combinations thereof, and/or the like. In some embodiments, the metadata may exclude or omit metadata directed to PII (e.g., the metadata may not use data such as name or date of birth to avoid tying or otherwise attributing the template to a specific user). The metadata may be automatically applied by a system (e.g., a system 100) and/or components thereof (e.g., a computing device 102). For example, in embodiments where a facial scan is a captured by a camera, the camera may send metadata information (e.g., date and time of the captured image) to the database 130. A processor (e.g., a processor 104) may receive the metadata information and connect the information to the biometric capture and/or the template.

The method 200 also comprises comparing the biometric template to one or more existing biometric templates (step 224). A processor (e.g., a processor 104) may make use of an algorithm (e.g., an algorithm 124) to compare the biometric template to one or more existing templates. In some embodiments, the algorithm may determine differences between the compared templates (e.g., based on pixel values, matrix values, matrix sizes/dimensions, etc.). In some embodiments, the comparison may make use of a threshold to verify or determine that the biometric template matches an existing template. For example, the algorithm may provide or output a quantified degree of similarity (or difference) between the biometric template and each of the existing biometric templates (e.g., a percentage of matching values of pixels or matrices between the biometric template and each of the existing biometric templates, a statistical likelihood that the compared values depict the same template, etc.).

In such embodiments, the degree of similarity may be based on the amount of biometric data captured. For instance, if a user of the system 100 desires fewer captured biometric items (e.g., when using the system to permit a mailman to access a property), the user may lower the threshold needed to return a positive result. The lower threshold may allow the mailman to be passively identified (e.g., a facial scan is captured by a camera on the property without the mailman needing to stop and submit the facial scan), saving time and providing peace of mind to the user. In other embodiments, such as when accessing a restricted area, a user of the system may require additional biometric data (e.g., a facial scan, a fingerprint scan, and a voice scan) to verify the individual attempting to access the restricted area. The user may additionally or alternatively require a higher threshold of accuracy to increase the likelihood that only authorized individuals access the restricted area.

The method 200 also comprises generating a message based on the comparison (step 228). The message (e.g., confirmation signal, electronic signal, etc.) may indicate a result of the comparison. For instance, when the comparison of the biometric template to the one or more existing biometric templates, such as in the step 224, indicates that the two templates match (or meet a quantified degree of similarity), the message may indicate that the biometric template and the existing biometric template represent the same data (e.g., the templates belong to or otherwise represent the same person). The message may be communicated to one or more devices over a network. In one embodiment, the message may be used to compare the user with a whitelist or to trigger an alarm. For example, in embodiments using a whitelist the message may indicate that the person matches an individual on the whitelist. A system (e.g., a system 100) may then permit the person to enter a restricted area (e.g., by unlocking a door to an area that is off limits to individuals not on the whitelist). In some embodiments, the message may trigger an alarm system. For instance, a security system may receive the message indicating that the person is in an unauthorized location in a building and may notify security and/or cause an alarm to be triggered.

The present disclosure encompasses embodiments of the method 200 that comprise more or fewer steps than those described above, and/or one or more steps that are different than the steps described above.

Figure 3:
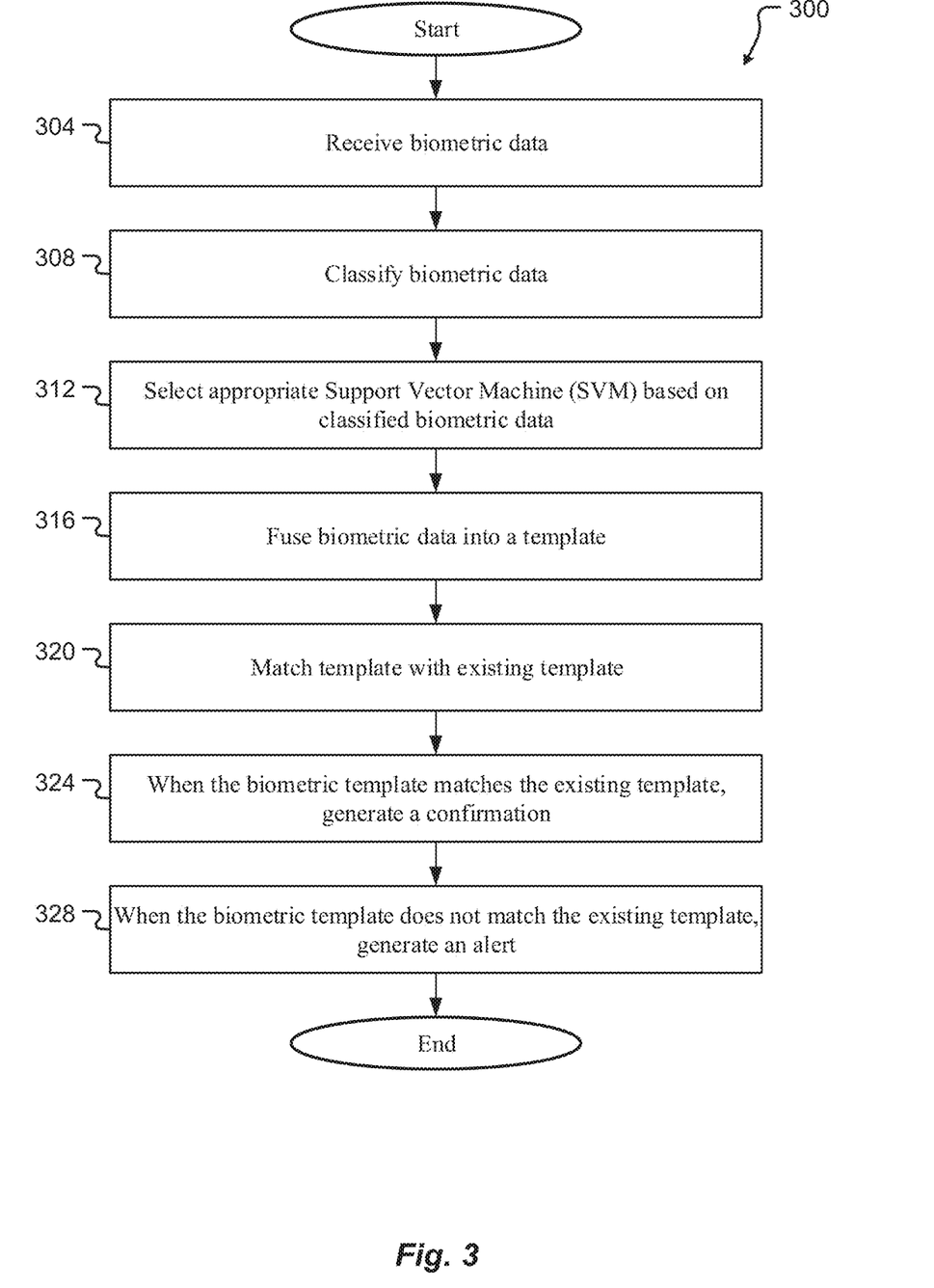
FIG. 3 is a flowchart in accordance with embodiments of the present disclosure.

A method 300 comprises receiving biometric data (step 304). The biometric data may be data extracted from a biometric capture, such as a facial scan, fingerprint scan, an iris scan, combinations thereof, and/or the like. In some embodiments, the receive biometric data may be the biometric information captured (e.g., by a step 204) by one or more devices (e.g., a camera). The biometric data may be received from a system (e.g., a system 100) and/or one or more components thereof (e.g., a database 130, a computing device 102, etc.).

The method 300 also comprises classifying the received biometric data (step 308). The method 300 may be carried out by, for example, a processor (e.g., a processor 104) accessing one or more algorithms (e.g., an algorithm 124) to classify the received biometric data (e.g., using a support vector machine trained on similar biometric data to classify the received biometric data, using a K-Nearest Neighbor (KNN) algorithm, etc.). The classifying may comprise comparing one or more features of the received biometric data to existing biometric data to appropriately classify the biometric data. For instance, in embodiments where the biometric data is related to a facial scan, a system (e.g., a system 100) and/or one or more components thereof (e.g., a processor 104), may use a face classifier (e.g., a machine learning algorithm trained on facial data) to verify that the biometric data pertains to a face and/or to output a confidence value (e.g., a match score) associated with the facial data. The confidence value may indicate a degree of likelihood that the data passing through the face classifier is indeed data associated with a face. The confidence value may be percent based (e.g., 99%, 95%, 90%, etc.), which may represent the likelihood that the classified biometric data pertains to the biometric item used to train the system. In some embodiments, the classifying may comprise using more than one classifier to classify the biometric data. For instance, the biometric data may correspond to a facial scan, and the biometric data may be passed into one or more classifiers trained on various data (e.g., a classifier trained on fingerprint scan data, a classifier trained on facial scan data, etc.). The one or more classifiers may then output confidence values. In this embodiment, since the biometric data corresponds to a facial scan, the confidence value associated with passing the biometric data through a classifier trained on facial scan data may be a higher confidence (e.g., be a higher confidence value) than the confidence value associated with passing the biometric data through a classifier trained on fingerprint scan data, which may indicate that the biometric data may be more likely to be based on a facial scan than a fingerprint scan. A system (e.g., the system 100) and/or components thereof (e.g., a computing device 102) may receive the confidence values and determine, based on the best (e.g., highest, closest, etc.) score, what type of biometric capture the biometric data represents, and label the biometric data accordingly (e.g., using metadata to indicate what type of biometric capture is represented by the biometric data).

The method 300 also comprises selecting an appropriate Support Vector Machine (SVM) based on the classified biometric data (step 312). The selected SVM may be based on, for example, the biometric data received in the method 300. The SVM may be used by a system (e.g., a system 100) and/or one or more components thereof (e.g., a computing device 102) to fuse biometric data into a unique template matrix. In some embodiments, the biometric data may be data related to more than one biometric item (e.g., a facial scan and a fingerprint scan). This may occur, for example, when a user inputs more than one biometric scan (e.g., a facial scan and a voice scan) for verification. In such embodiments, classifiers trained on the respective data may be used in combination to classify the data. For instance, a classifier may be trained using both facial scan data and voice scan data (e.g., a face and voice scan SVM), and may be used by the system and/or one or more components thereof to process the data to create a unique template matrix (e.g., to fuse classifications).

The method 300 also comprises fusing biometric data into a template (step 316). The fusing may include using an SVM (e.g., a face and fingerprint SVM configured to combine data associated with a facial scan and data associated with a fingerprint scan). The template may be a fusion (e.g., combination, mix, etc.) of the biometric data. In some embodiments, the selected SVM may manipulate (e.g., using matrix multiplication, linear mapping, etc.) the biometric data into various layers to form a template. For example, the biometric data may comprise face and fingerprint data. The selected SVM (e.g., a face and fingerprint SVM configured to receive face and fingerprint data) may receive the biometric data and output a manipulated version of the data (e.g., using linear mapping) as a template. In some embodiments, the SVM may take or make multiple transformations to the biometric data to further obscure or mix the biometric data. The further mixing may prevent or increase the difficulty associated with recovering the original biometric data, which further protects individual data from potential bad actors (e.g., hackers, scammers, etc.). The fused template may be stored in the system and/or one or more components thereof (e.g., a database 130).

In some embodiments, the fusion (e.g., of face data and fingerprint data) may be given by the Neyman-Pearson lemma, using distributions of genuine and imposter fusion score distributions. A fusion formula approximating the fusion using a false match rate (FMR) based on imposter scores may be derived based on imposter scores. The probability of falsely matching all n biometrics is the product of probabilities of a false match, given that the biometrics are independent of one another. In some embodiments, the scores may be defined logarithmically as a function of the FRM determined from a general test set of imposters. The logarithmic mapping changes the product to a sum of probabilities, which may then be adjusted using a function to approximate the Neyman-Pearson fusion.

By defining the scores logarithmically as a function of the FMR and combining the sum of probabilities, genuine mated pairs are not needed to model scores. The adjustment using the function ensures the output scores are defined logarithmically as a function of FMR. This allows a system to define a single threshold for the fusion of multiple biometric modalities, which is directly related to system performance. The method may be applicable to both homogenous fusion (e.g., multiple instantiations of a single biometric modality) and heterogenous fusion (e.g., multiple biometric modalities).

Examples of techniques that disclose how to perform fusion (e.g., using score distributions) that can be used with any one or more of the embodiments disclosed herein are:

1. J. P. Hube. Neyman-Pearson Biometric Score Fusion as an Extension of the Sum Rule, *SPIE Biometric Technology for Human Identification IV*, Orlando, FL, 2007.
2. J. P. Hube. Formulae for consistent biometric score level fusion, 2017 *IEEE International Joint Conference on Biometrics (IJCB)*, Denver, CO, 2017, pp. 329-334.

Both of which are incorporated herein by reference in their entirety.

The method 300 also comprises matching the template with an existing template (step 320). The matching in the step 320 of the method 300 may be similar to or the same as the step 224 of the method 200. For example, the method 300 may use one or more algorithms (e.g., an algorithm 124) to determine a match between the template and the existing template. In some embodiments, the algorithm may compare the template to one or more existing templates to determine the closest match. In some embodiments, if the algorithm does not match the template to an existing template, a processor (e.g., a processor 104) may determine that the template corresponds to an unknown or unidentified person (e.g., a user without a previously constructed template). The comparison may include comparing, for example, pixel values, biometric data patterns, matrix values, combinations thereof, and/or the like. For instance, a template comprising face and voice data may be compared to existing templates containing both face and voice data.

In some embodiments, the matching may comprise using unimodal matching. Unimodal matching may include breaking down the template to a single sample, instance, or feature. For instance, the template may be compared against existing single samples of facial scans (e.g., scans of front, right, and/or left profiles), fingerprint scans (e.g., thumb scan, forefinger scan, middle finger scan, combinations thereof, etc.), sensor scans (e.g., IR scan of individual face, depth sensors, RGB images, etc.), unique biometric features (e.g., a fingerprint scan of a finger with tissue damage), iris scans, combinations thereof, and/or the like. The algorithm may determine an optimized unimodal output to determine the most closely matching existing template. After deconstructing the template to one or more of the single samples, the algorithm may output the most closely matching (e.g., a degree of similarity exceeding or falling below (depending on application) a threshold value) template. In one example, the template may include data corresponding to an iris scan and a facial scan. The algorithm may compare the template using unimodal matching, and which may return a degree of similarity or confidence value associated with the comparison. In this example, any existing templates that contain similar iris scan and facial scan data may be returned as a match.

Additionally or alternatively, the matching may comprise using multimodal matching. Multimodal matching may include comparing the biometric data to multiple traits or scans. For example, the biometric template may be deconstructed into iris scans and fingerprint scans. The deconstructed biometric data may be compared with existing iris scans and fingerprint scans, with the closest matches being returned by the algorithm. In some embodiments, both unimodal and multimodal matching may be implemented and compared to select existing biometric data.

The method 300 also comprises generating a confirmation when the biometric template matches the existing template (step 324). The confirmation may be based on the results of the comparison of the biometric template to existing templates. For instance, if the matching determines that a biometric template (e.g., containing facial scan data) matches an existing template (e.g., facial scan data previously capture or stored), a confirmation that the template matches the existing template, which may indicate that the facial scan provided by the individual matches an existing facial scan. In some embodiments, the method 300 may utilize a threshold for generating the confirmation. The threshold may be defined by the system, components thereof, and/or a user and may indicate that a degree of match between the generated template and the existing templates sufficient to permit certain actions, such as identifying the user as a member of a whitelist. The confirmation may be sent to one or more components of a system (e.g., a system 100), which may determine whether or not to perform an action (e.g., indicate that the user is on a whitelist).

In some embodiments, the system may define a percent threshold (e.g., 99.9%, 99%, 98%, 97%, etc.) above which the system defines the biometric template as matching the existing template. For example, a threshold of 98% may indicate that, when the output of an SVM outputs a confidence value or degree of similarity at or above 98%, the two templates will be treated as the same with respect to the biometric data received by the SVM and a confirmation (e.g., an electronic signal) will be generated. In this example, any value falling below the 98% threshold will not return a confirmation, which may indicate that the biometric template does not match the existing template, at least to a desired degree of certainty (e.g., there is insufficient certainty that, if the system performs an action, such as indicating the user is on a whitelist, the user would actually be on the whitelist).

The method 300 also comprises generating an alert when the biometric template does not match the existing template (step 328). The alert may be based on the results of the comparison of the biometric template to existing templates. For example, if the comparison indicates that the biometric template does not match any of the existing templates (e.g., a predetermined threshold for identifying a match has not been met), the biometric template and the existing templates may not match. The alert may be sent to a system (e.g., a system 100) and/or one or more components thereof (e.g., a computing device 102) to indicate that the biometric template does not match any of the existing templates. The alert may indicate to the system, components thereof, a user, and/or the like that the user cannot be identified by the system. The alert may be an audible alert, a visual alert, or a combination thereof.

The present disclosure encompasses embodiments of the method 300 that comprise more or fewer steps than those described above, and/or one or more steps that are different than the steps described above.

Any of the steps, functions, and operations discussed herein can be performed continuously and automatically.

The exemplary systems and methods of this disclosure have been described in relation to an AdHoc enrollment process. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Aspects of the disclosed technology are directed to:

Capturing biometric information associated with a user; extracting biometric data from the biometric information; generating a first template representative of the biometric data; comparing the first template with one or more stored templates to quantify a degree of similarity therebetween; sending, when the quantified degree of similarity between first template and a second template exceed a threshold, a confirmation.

Any of the above aspects, wherein the confirmation is sent over a network to a user device.

Any of the above aspects, wherein the biometric data comprises information captured from one or more of a facial scanner, a camera, a microphone, a fingerprint scanner, and an iris scanner.

Any of the above aspects, wherein the confirmation triggers an alarm system.

Any of the above aspects, wherein the confirmation indicates the user is on a whitelist.

Any of the above aspects, wherein the comparing the first template with the one or more stored templates comprises using an algorithm to classify the first template.

Any of the above aspects, wherein the algorithm is a Support Vector Machine (SVM).

Any of the above aspects, wherein the algorithm is a K-Nearest Neighbor (KNN) algorithm.

Any of the above aspects, wherein the threshold is set by a user device.

A system comprising: a processor; and a memory storing instructions thereon that, when executed by the processor, cause the processor to: receive biometric information associated with a first user; extract biometric data from the biometric information; generate a first template representative of the biometric data; compare the first template with one or more stored templates to quantify a degree of similarity therebetween; and sending, when the quantified degree of similarity between the first template and the second template is below a threshold, an alert.

Any of the above aspects, wherein the biometric information is information related to one or more of a facial scan, an iris scan, a fingerprint scan, and a voice scan.

Any of the above aspects, wherein the alert is sent over a communication network to a user device.

Any of the above aspects, wherein the alert triggers an alarm system.

Any of the above aspects, wherein the first template comprises biometric information related to one or more of a facial scan, an iris scan, a fingerprint scan, and a voice scan.

Any of the above aspects, wherein the degree of similarity is set by a second user different from the first user.

Any of the above aspects, further comprising: labeling, with a session tag, the biometric information.

Any of the above aspects, wherein the session tag omits associating personally identifiable information (PII) with the first user.

Any of the above aspects, wherein a record of the session tag is stored in a database.

A system comprising: a processor; an imaging device; a user device coupled to the processor; and a memory storing instructions thereon that, when executed by the processor, cause the processor to: capture, using the imaging device, an image of a user; add a session tag to the captured image; generate a first template from the captured image; determine, based on a predetermined threshold, whether the first template matches a second template; when the first template matches the second template, generate and send a confirmation to the user device; and when the first template does not match the second template, generate and send an alert the user device.

Any of the above aspects, wherein the user device is configured to at least one of decrease and increase the predetermined threshold.

A non-transitory computer-readable medium comprising a set of instructions stored therein which, when executed by a processor, cause the processor to: capture biometric information associated with a user; extract biometric data from the biometric information; generate a first template representative of the biometric data; compare the first template with one or more stored templates to quantify a degree of similarity therebetween; and send, when the quantified degree of similarity between the first template and a second template exceed a threshold, a confirmation.

Any of the above aspects, wherein the biometric information is information related to one or more of a facial scan, an iris scan, a fingerprint scan, and a voice scan.

Any of the above aspects, wherein the alert is sent over a communication network to a user device.

Any of the above aspects, wherein the alert triggers an alarm system.

Any of the above aspects, wherein the first template comprises biometric information related to one or more of a facial scan, an iris scan, a fingerprint scan, and a voice scan.

Any of the above aspects, wherein the degree of similarity is set by a second user different from the first user.

Any of the above aspects, further comprising: labeling, with a session tag, the biometric information.

Any of the above aspects, wherein the session tag omits associating personally identifiable information (PII) with the first user.

Any of the above aspects, wherein a record of the session tag is stored in a database.

A system comprising: a means for capturing biometric information associated with a user; a means for extracting biometric data from the biometric information; a means for generating a first template representative of the biometric data; a means for comparing the first template with one or more stored templates to quantify a degree of similarity therebetween; and a means for sending, when the quantified degree of similarity between the first template and a second template exceed a threshold, a confirmation.

Any of the above aspects, wherein the biometric information is information related to one or more of a facial scan, an iris scan, a fingerprint scan, and a voice scan.

Any of the above aspects, wherein the alert is sent over a communication network to a user device.

Any of the above aspects, wherein the alert triggers an alarm system.

Any of the above aspects, wherein the first template comprises biometric information related to one or more of a facial scan, an iris scan, a fingerprint scan, and a voice scan.

Any of the above aspects, wherein the degree of similarity is set by a second user different from the first user.

Any of the above aspects, further comprising: a means for labeling, with a session tag, the biometric information.

Any of the above aspects, wherein the session tag omits associating personally identifiable information (PII) with the first user.

Any of the above aspects, wherein a record of the session tag is stored in a database.

A method comprising: registering a user biometric, comprising: capturing a first biometric modality associated with a user at a first time; extracting first biometric data from the biometric modality; and generating a first template based on the first biometric data; and enrolling the user in a system, comprising: capturing the first biometric modality associated with the user at a second time after the first time; extracting second biometric data from the first biometric modality; generating a second template based on the second biometric data; comparing the second template with the first template to quantify a degree of similarity therebetween; and sending, when the quantified degree of similarity between the first template and a second template exceed a threshold, a confirmation.

Any of the above aspects, wherein the confirmation is sent over a network to a user device.

Any of the above aspects, wherein the first biometric data and the second biometric data comprise information captured from one or more of a facial scanner, a camera, a microphone, a fingerprint scanner, and an iris scanner.

Any of the above aspects, wherein the confirmation triggers an alarm system.

Any of the above aspects, wherein the confirmation indicates the user is on a whitelist.

Any of the above aspects, wherein the comparing the first template with the second template comprises using an algorithm to classify the first template.

Any of the above aspects, wherein the algorithm is a Support Vector Machine (SVM).

Any of the above aspects, wherein the algorithm is a K-Nearest Neighbor (KNN) algorithm.

Any of the above aspects, wherein the threshold is set by a user device.

A system comprising: a processor; and a memory storing instructions thereon that, when executed by the processor, cause the processor to: receive a first biometric modality and a second biometric modality associated with a user; generate a first template, the first template being a fusion of data associated with the first biometric modality and the second biometric modality; compare the first template with one or more stored templates to quantify a degree of similarity therebetween; and send, when the quantified degree of similarity between the first template and each of the one or more stored templates is below a threshold, an alert.

Any of the above aspects, wherein the first biometric modality and the second biometric modality each comprise information related to one or more of a facial scan, an iris scan, a fingerprint scan, and a voice scan.

Any of the above aspects, wherein the alert is sent over a communication network to a user device.

Any of the above aspects, wherein the alert triggers an alarm system.

Any of the above aspects, wherein the first template is determined using the Neyman-Pearson lemma.

Any of the above aspects, wherein the degree of similarity is a percent-based value.

Any of the above aspects, further comprising: labeling, with a respective session tag, each of the first biometric modality and the second biometric modality.

Any of the above aspects, wherein each of the session tags omits associating personally identifiable information (PII) with either of the first biometric modality and the second biometric modality.

Any of the above aspects, wherein a record of each of the session tags is stored in a database.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A user authentication method comprising:
   registering a user biometric, comprising:
      receiving, first biometric information, in a first biometric modality, associated with a user at a first time;
      extracting at least first biometric data from the first biometric information; and
      generating a first template at least based on the first biometric data; and
   enrolling the user in a system, comprising:
      receiving the first biometric information associated with the user at a second time, the second time occurring after the first time;
      extracting at least second biometric data from the first biometric information;
      generating a second template at least based on the second biometric data;
   comparing, using one or more processors and memory, the second template with the first template to generate a confidence value representing a degree of similarity therebetween; and
   generating and sending, at least based on comparison of the confidence value to a threshold value, at least one of a confirmation, an electronic signal and an alert.

2. The method of claim 1, wherein the confirmation or electronic signal is sent when the confidence value is greater than or equal to the threshold value, and wherein the alert is sent when the confidence value is less than the threshold value.

3. The method of claim 1, wherein the confirmation or electronic signal indicates the user is on a whitelist, and wherein the alert triggers an alarm system.

4. The method of claim 1, wherein the first biometric data and the second biometric data comprise information captured from one or more of an iris scanner, a camera, a microphone, a facial scanner, and a fingerprint scanner.

5. The method of claim 1, wherein at least one of machine learning and artificial intelligence is used to classify the first template.

6. The method of claim 5, wherein the at least one of machine learning and artificial intelligence comprises at least one of a Support Vector Machine (SVM) and K-Nearest Neighbor (KNN).

7. The method of claim 1, wherein a user device is configured to at least one of increase and decrease the threshold value.

8. A user authentication system, comprising:
one or more processors; and
a memory configured to store instructions thereon that, when executed by the one or more processors, cause the processors to:
receive electronically first biometric information and second biometric information associated with a user;
extract at least first biometric data from the first biometric information;
extract at least second biometric data from the second biometric information;
generate a first template that at least includes a combination or mix of the first biometric data and the second biometric data;
compare the first template with at least one stored template to generate a confidence value representing a degree of similarity therebetween; and
generate and send, at least based on comparing the confidence value to a threshold value, at least one of a confirmation, an electronic signal and an alert.

9. The system of claim 8, wherein the confirmation or electronic signal is sent when the confidence value is greater than or equal to the threshold value, and wherein the alert is sent when the confidence value is less than the threshold value.

10. The system of claim 8, wherein the confirmation or electronic signal indicates the user is on a whitelist, and wherein the alert triggers an alarm system.

11. The system of claim 8, wherein the first biometric data and the second biometric data comprise information captured from one or more of an iris scanner, a camera, a microphone, a facial scanner, and a fingerprint scanner.

12. The system of claim 8, wherein the instructions further enable the processor to:
add, to one or more of the first biometric information and the second biometric information, a session tag.

13. The system of claim 12, wherein the session tag is stored in a database.

14. The system of claim 8, wherein personally identifiable information associated with the first biometric information and the second biometric information is omitted when the first template is generated.

15. The system of claim 8, wherein the instructions further enable the processor to:
at least one of increase and decrease the threshold value.

16. The system of claim 8, wherein the instructions further enable the processor to:
render, to a user device, a virtual representation of the first template.

17. A user authentication system, comprising:
one or more processors; and
memory configured to store instructions thereon that, when executed by the one or more processors, cause the processors to:
receive electronically first biometric information associated with a user;
generate, at least based on the first biometric information, a first template;
compare the first template with a second template to generate a confidence value representing a degree of similarity therebetween;
compare the confidence value to a threshold value; and
generate and send, at least based on the comparing of the confidence value and the threshold value, at least one of a confirmation, an electronic signal and an alert.

18. The system of claim 17, wherein the first biometric information comprises information captured by one or more of an iris scanner, a camera, a microphone, a facial scanner, and a fingerprint scanner.

19. The system of claim 17, wherein the confirmation is sent to a user device.

20. The system of claim 17, wherein the instructions further enable the processor to:
attach, to the first biometric information, a session tag that omits personally identifiable information associated with the first biometric information.

* * * * *